(12) United States Patent
Ambs

(10) Patent No.: US 7,198,306 B2
(45) Date of Patent: Apr. 3, 2007

(54) SPRING-BIASED LOCKING BOLT

(75) Inventor: Peter Ambs, Furtwangen (DE)

(73) Assignee: Otto Ganter GmbH & Co. KG, Furtwangen (DE)

( * ) Notice: Subject to any disclaimer, the term of this patent is extended or adjusted under 35 U.S.C. 154(b) by 0 days.

(21) Appl. No.: 10/920,147

(22) Filed: Aug. 17, 2004

(65) Prior Publication Data

US 2005/0099015 A1 May 12, 2005

(30) Foreign Application Priority Data

Aug. 22, 2003 (DE) ............... 103 38 621

(51) Int. Cl.
*E05C 1/10* (2006.01)
(52) U.S. Cl. .............. 292/175; 292/DIG. 37; 411/347; 411/403; 411/407; 403/321; 403/322.1; 403/325
(58) Field of Classification Search ......... 403/109.3, 403/109.8, 322.1, 322.2, 325, 321, 351; 411/347, 411/403, 407; 292/175, DIG. 37
See application file for complete search history.

(56) References Cited

U.S. PATENT DOCUMENTS

| | | | |
|---|---|---|---|
| 2,640,245 A | 6/1953 | Becker | |
| 2,931,087 A | 4/1960 | Farrar et al. | |
| 3,397,000 A * | 8/1968 | Nakanishi | 292/61 |
| 3,908,488 A * | 9/1975 | Andersen | 81/121.1 |
| 4,113,221 A * | 9/1978 | Wehner | 248/408 |
| 4,602,890 A * | 7/1986 | Duda | 403/105 |
| 5,433,552 A * | 7/1995 | Thyu | 403/378 |
| 5,586,852 A * | 12/1996 | Ganter | 411/353 |
| 6,746,058 B2 * | 6/2004 | Kienzler | 292/175 |
| 2002/0159860 A1 * | 10/2002 | Kienzler | 411/352 |

* cited by examiner

*Primary Examiner*—Daniel P. Stodola
*Assistant Examiner*—Daniel J. Mills
(74) *Attorney, Agent, or Firm*—Norris McLaughlin & Marcus, PA

(57) ABSTRACT

A spring-biased locking bolt with an operating button and a bolt connected with the operating button is described, wherein the bolt is spring-biased and movable in a sleeve. The sleeve is screwed into a corresponding opening in a machine part or an item of furniture, wherein the bolt can engage in the opening. The locking bolt has an optional catch that fixes the pulled-out bolt in its raised position. A sleeve section oriented in an axial direction is formed on the operating button, wherein the longitudinally movable and spring-biased sleeve engages with its polygonal shoulder with the polygonal opening.

7 Claims, 2 Drawing Sheets

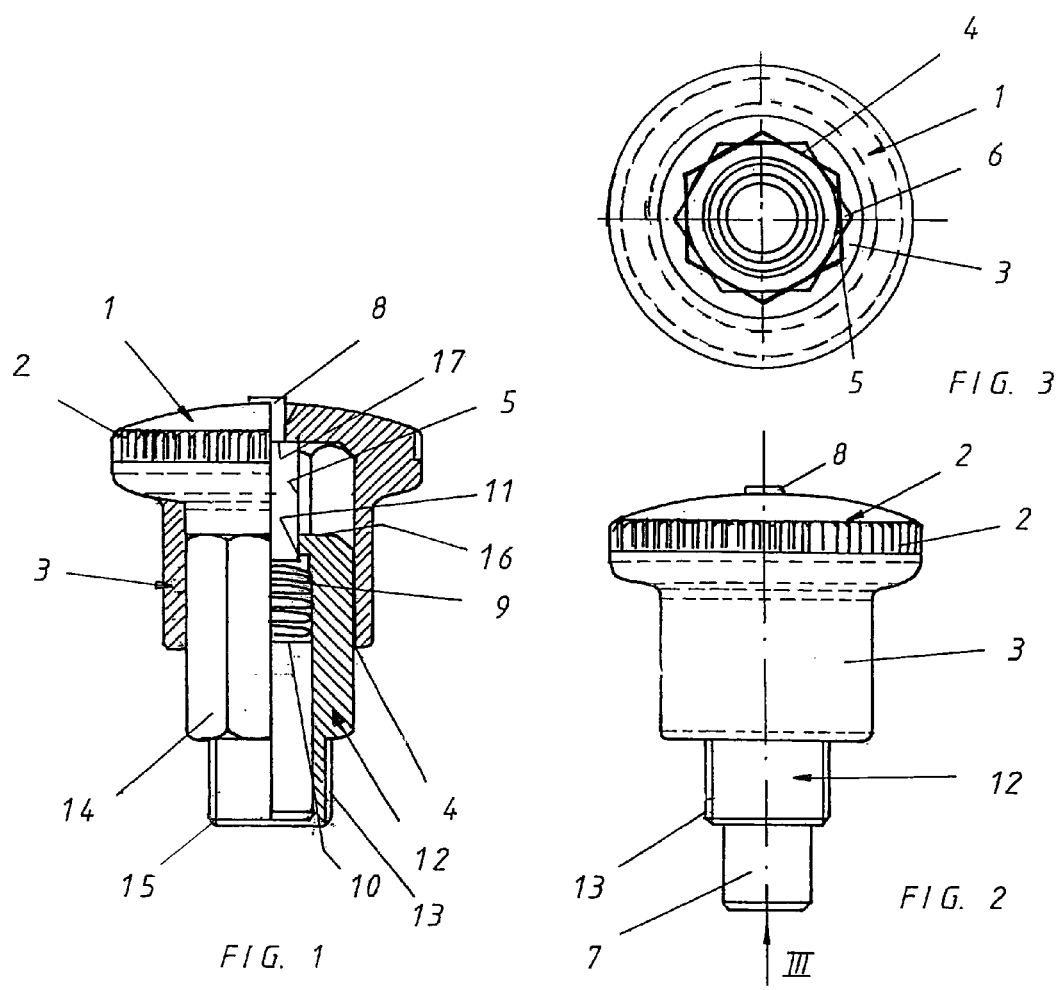

SPRING-BIASED LOCKING BOLT

BACKGROUND OF THE INVENTION

Figure 6:
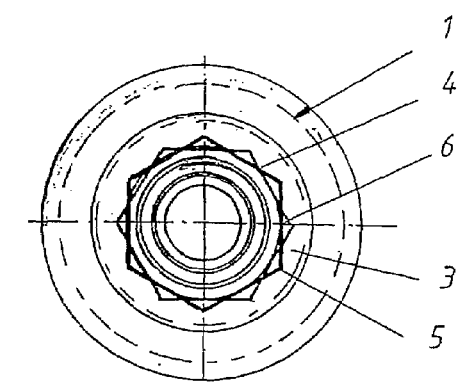

The invention relates to a spring-biased locking bolt. Such spring-biased locking bolts are used for a locking connection between two associated elements for general applications in machine tools and furniture manufacturing. A spring-biased locking bolt of this type is essentially made of an operating button that is firmly attached to an approximately cylindrical bolt that extends through a sleeve, with a screw thread arranged on the bottom end of the sleeve.

The screw thread is used to insert the sleeve into an opening located on an item of furniture or a machine part, whereby the bolt that is attached to the operating button extends through the opening into the item of furniture or machine part and engages with an additional opening in an opposing part aligned with the opening. The locking bolt can thereby be used to connect two related parts with each other.

The connection between the two parts is released by pulling on the operating button. The bolt is thereby pulled out of the corresponding opening in the opposing part against the spring force.

Spring-biased locking bolts with an operating button that includes a catch have also been reported. The catch causes the operating button to remain in the pulled-out position after it has been pulled out. The bolt that is connected with the operating bolt is thus permanently disengaged from the opening in the machine part or item of furniture, and the connection between the two parts is severed.

In another embodiment, the catch includes two opposing projecting pins arranged on the bottom side of the operating button and extending in the axial direction. In the locked position, the pins contact the upper end face of the spring-biased sleeve.

The latching engagement is produced by pulling the operating button out of the sleeve against the spring force and rotating the operating button until the pins arranged on the bottom side of the operating button make contact with the upper end face of the sleeve. In this position, the operating button is locked, and the pin connected with the operating button is permanently disengaged from the corresponding opening on the machine part or item of furniture.

Conversely, in the locked position, the pins located on the bottom side of the operating button engage in slots arranged in the wall of the sleeve.

A spring-biased locking bolt of this type has the disadvantage that the two pins attached on the operating button are not very strong and can easily break off.

Moreover, the entire locking arrangement is exposed and susceptible to contamination. The guide sleeves disposed in the slots also adversely affect the axial longitudinal guiding of the pins that extend through the guide sleeve. Due to the slots extending through the wall of the sleeve, the opening in the guide sleeve is no longer completely round (cylindrical), but is broken up by the slots arranged along the circumference. As a result, the locking bolt has an undesirable radial play, causing the opening to wear out faster.

This arrangement also diminishes the visual appearance, because the pins on the bottom side of the operating buttons are visible from the side. The manufacturing cost for an operating button are also relatively high, because forming dimensionally stable pins on the bottom side of the operating button requires a more complex cutting process in manufacture, which is also the case when producing a mold tool if such part is to be made out of plastic or cast metal.

Because the pins attached on the bottom side of the locking bolt are visible from the side, they can also be easily damaged. For example, a pin can be sheared off or break off, thus destroying the locking functionality of the spring-biased bolt.

A simpler embodiment of a spring-biased locking bolt has also been disclosed, which lacks the aforementioned catch between the spring-biased movable sleeve and the operating button.

In this simpler embodiment, the spring-biased sleeve is guided on the bolt that is connected with the operating button. This simplified embodiment, however, cannot be modified to include an additional catch.

BRIEF SUMMARY OR THE INVENTION

It is therefore an object of the invention to modify a spring-biased locking bolt of the aforedescribed type in such a way that it can be easily modified from a simple design without a catch to a design that includes a catch.

A spring-biased locking bolt with an operating button (1) and a bolt (7) connected with the operating button (1), the bolt (7) being movable under spring-bias in a sleeve (12) which is screwed into a corresponding opening in a part, wherein the bolt (7) is engagable in the opening, with the locking bolt optionally having a catch which fixes the pulled-out bolt (7) in its raised position, comprising a sleeve section (3) oriented in an axial direction and formed on the operating button, a longitudinally movable sleeve (12, 22) having a polygonal shoulder (14); wherein the polygonal shoulder (14) engages with a spring bias in a polygonal profile (5) disposed in the sleeve section (3).

Advantageously, with this technical teaching, the catch is no longer produced by arranging and forming pins on the bottom side of the operating button. The operating button is (preferably) formed as one piece with a sleeve section and made of the same material as the sleeve section. The sleeve section is oriented in an axial direction and has a central opening in which the spring-biased movable sleeve can be inserted. The interior surface of the sleeve section facing the button has a polygonal profile that matches the polygonal exterior profile of the longitudinally movable sleeve.

With this technical teaching an operating button is claimed, which includes a polygonal profile disposed on its sleeve section that is associated with the catch.

The claimed operating button, in its simplest embodiment (without catch), includes only the functional elements required for producing a catch.

Modifying this simple operating button without a catch into a corresponding button with a catch is particularly easy, because it is only necessary to change the shape of the spring-biased sleeve that moves into the sleeve section.

If a catch is not desired, then the sleeve has a polygonal profile extending over the exterior periphery of the entire pulled-out length that moves into the interior opening of the sleeve section. Although the sleeve can be pulled out of the sleeve section on the button, but cannot be rotated and latched.

Conversely, if a catch is to be implemented, then the polygonal profile need only extend over a certain axial length on the exterior surface of the spring-biased movable sleeve. The exterior circumference of the sleeve is provided with a round profile over a portion of the axial pulled-out length. In this way, the sleeve can be pulled out off the sleeve section disposed on the button against the spring force, rotated and latched in the rotated position on the end face of the sleeve section.

As compared to conventional devices, the catch according to the invention has a small overall height and guides the bolt better, because no lateral slots are required. The catch is not visible and is protected against contamination and damage.

The smaller radial play of the bolt is achieved by omitting slots which would otherwise weaken the side wall of the sleeve, and by placing the catch (in axial direction) on the front end face of the sleeve section. The sleeve section is then completely circular and able to guide the bolt in the longitudinal direction over its entire surface. Moving to the catch to the front end face of the sleeve section also decreases the overall height.

The present technical teaching therefore advantageously provides a virtually invisible catch that can be placed between the latching bolt and the spring-biased movable sleeve. The catch is protected from damage by being located on the end face of the sleeve section of the operating button.

The present invention hence provides two different embodiments of a spring-biased locking bolt, namely a simpler embodiment without the aforementioned catch, and a more complex embodiment, where the spring-biased catch is placed between the operating button and the spring-biased sleeve.

Both embodiments having in common that the surface of the spring-biased movable sleeve includes a polygonal shoulder that extends into the sleeve section of the operating button, with the interior surface of the sleeve section being matched to the polygonal shoulder. In this way, the interior surface of the sleeve section extends over the polygonal shoulder on the exterior surface of the sleeve, and the two sections are secured against rotation relative to each other, but can move against each other in the axial direction.

Advantageously, in the simple embodiment—where the polygonal shoulder extends over the entire length of the sleeve section—the operating button can be easily pulled out of the sleeve, thereby obviating the need for a catch.

When the catch is engaged, there is always a turn-lock connection between the sleeve and the operating button, and by turning the operating button (via a knurled section arranged on the head) the threaded forward projection of the spring-biased sleeve section can be screwed into a corresponding opening on the item of furniture or the machine part.

The locking bolt, after having been screwed in, is now ready for use, and the bolt that is arranged on the operating button is disengaged from a corresponding stationary opening on the item of furniture or the machine part by pulling the operating button.

Advantageously, the exterior surface of the sleeve includes the polygonal shoulder. This has also the advantage that when the operating button is pulled out against the force of the compression spring, the exterior surface of the spring-biased sleeve is partially released, making the polygonal shoulder accessible for application of a turning tool.

The shoulder with its threaded projection can then not only be screwed into a corresponding threaded opening disposed on the machine part or the item of furniture, but in addition, a turning tool, for example a wrench, can be used to rotate and firmly secure the shoulder with the polygonal face in the corresponding threaded opening in the item of furniture or the machine part.

Advantageously, in this simple embodiment, a simple, spring-biased locking bolt without a catch can be used, whereby all parts necessary for a catch already exist on the button, so that another embodiment can be easily implemented, such as a spring-biased locking bolt with a catch.

As mentioned above, the interior opening of the sleeve section is implemented as a polygonal opening, for example a hexagonal opening that extends formfittingly with some play over the exterior surface of the spring-biased sleeve. The interior opening of the sleeve section is also implemented as a polygonal shoulder.

The same situation applies to the spring-biased locking bolt with a catch. In addition, the sleeve is now formed on the exterior surface as two separate parts. The exterior surface consists of a round shoulder, which extends into the polygonal bore of the sleeve section of the operating button. The round shoulder is no longer formfittingly movable in the polygonal opening, but is instead able to rotate. The exterior surface further includes a polygonal shoulder arranged subsequent to the round shoulder and cooperating with the corresponding polygonal profile on the end face of the sleeve section.

The catch can be reliably secured by associating an additional polygonal profile with the polygonal profile, with the additional polygonal profile machined into the end face of the sleeve section and operative to rotatably drive the sleeve.

For example, when a hexagonal profile is used, two hexagonal profiles with an angular offset are provided, resulting in a catch that is offset in the circumferential direction by 30 degrees.

Conversely, if other types of polygonal profiles are used, for example polygonal profiles with 2-, 3-, 5-, 6-, 7-, and 9-corner polygons, then other locking angles are obtained.

The subject matter of the present invention is not only recited in the individual claims, but is also inferred from the combination of these claims.

All elements and features disclosed in the application documents, including the summary, in particular the spatial arrangement shown in the drawings, are claimed as important for the invention, as long as they are novel over the state-of-the-art, when taken alone or in combination.

BRIEF DESCRIPTION OF THE SEVERAL VIEWS OF THE DRAWING(S)

The invention will be described in detail hereinafter with reference to the drawings that depict several embodiments. Additional characteristic features and advantages of the invention can be inferred from the drawings and their description.

Figure 4:
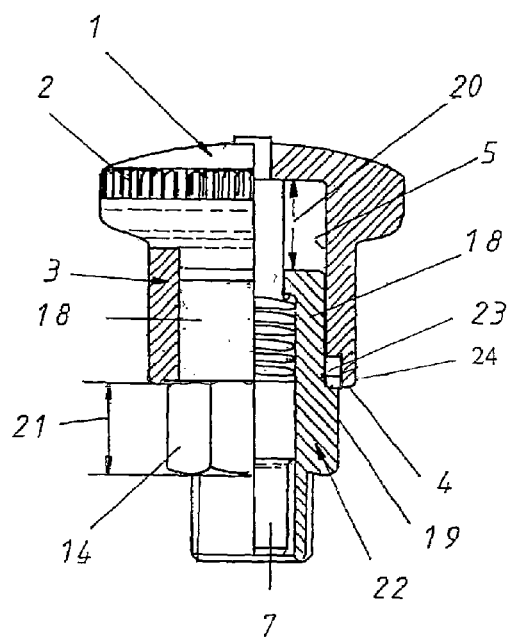
Figure 5:
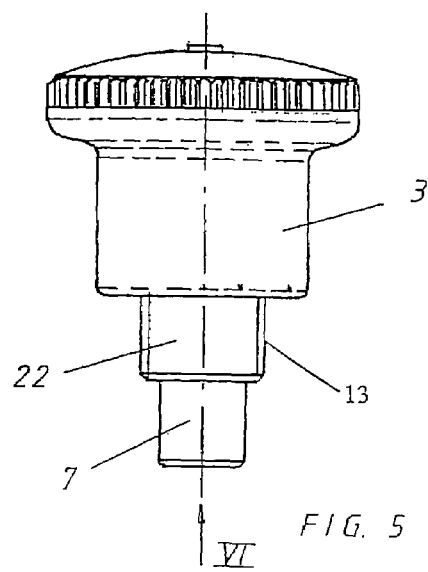

It is shown in:

FIG. 1 in two partial cross-sections, a cross-section through the spring-biased locking bolt without catch in a pulled-in or tensioned state, FIG. 2 a side view of the arrangement of FIG. 1 in the relaxed state, FIG. 3 a bottom view of the arrangement of FIG. 2 in the direction of the arrow III, FIG. 4 a partial cross-section through the spring-biased locking bolt with catch, FIG. 5 a side view of the arrangement of FIG. 4, and FIG. 6 a bottom view of the arrangement of FIG. 5 in the direction of arrow VI.

DETAILED DESCRIPTION OF THE INVENTION

FIGS. 1 to 3 show an operating button 1 which includes a cylindrical round section preferably formed of a plastic material. The operating button can also be made of a metal part. A circumferential knurled section 2 is arranged on the exterior circumference of the operating button 1, forming a handle for turning the operating button 1.

The operating button 1 it is formed of the same material and in one piece with the following axial sleeve section 3 that has an interior opening with a polygonal profile 5.

A bolt 7 is arranged in the polygonal opening 5 of the sleeve section 3, whereby the upper section of the bolt 7 is fixedly connected with the operating button 1 by way of a rivet head 8.

Accordingly, the bolt 7 extends through the entire interior opening of the sleeve section 3.

A sleeve 12 having an exterior surface with a polygonal shoulder 14 is movably arranged on the bolt 7. The length of the polygonal shoulder shown in FIG. 1 is selected so as to substantially extend over the entire length of the sleeve.

The polygonal shoulder 14 can move formfittingly (with a certain radial play) in the polygonal opening 5 of the sleeve section 3, and is hence coupled for rotation therewith. In this way, the sleeve 12 can rotate when the operating button 1 is turned.

The sleeve has on its bottom end a threaded projection 15 with a thread 13 that can be screwed into a corresponding opening on an item of furniture or a machine part.

The upper end face of the sleeve 12 forms a stop 16 towards the interior face 17 of the operating button 1.

A compression spring 9 is arranged between the sleeve 12 and the bolt 7. One end of the compression spring 9 rests against the shoulder 10 of the bolt 7, while the upper end of the compression spring 9 rests against a shoulder 11 of the sleeve 12.

When the operating button 1 is pulled out, it is pulled upward and compresses the spring, as shown in FIG. 1.

If the operating button is released, the interior face 17 of the operating button strikes the stop 16 of the sleeve 12.

This embodiment represents a simple, spring-biased locking bolt without a catch.

To simplify the design, this operating button 1 already includes the necessary elements for producing a catch, as described in more detail with reference to FIGS. 4 to 6.

The locking pin with the catch is described in more detail with reference to the embodiment depicted in FIGS. 4 to 6. The above descriptions of FIGS. 1 to 3 also apply to FIGS. 4 to 6. However, unlike in the aforedescribed embodiment, the sleeve 22 is now constructed on the exterior surface in two parts and includes a round shoulder 18 which projects into the sleeve section 3. This sleeve section 3 has, as before, the polygonal opening 5. The round shoulder 18 can therefore freely rotate in the opening 5, and there is no rotary connection between the operating button 1 and the sleeve 22 in the pulled-in position.

A polygonal shoulder 19 is arranged on the sleeve 22 directly after the round shoulder 18. The polygonal shoulder 19 and the round shoulder 18 are made from the same material and as a single piece.

The end face of the polygonal shoulder 19 is hence provided with a corresponding latching surface 24 in the form of a polygonal shoulder that cooperates with the aforedescribed polygonal profiles 5, 6 arranged on the sleeve section 3 of the operating button.

Only the polygonal profile 5 needs to be present for producing a catch, because the polygonal shoulder 19 formed as a latching surface 24 contacts the front face 4 of the sleeve section 3 at some place (undefined) outside the tips of the polygonal profile 5, thereby forming a kind of catch.

In order to make this catch stable and to prevent rotation, the additional latching surface is arranged as a polygonal profile 6 on the end face 4 of the sleeve section 3, with an offset in the rotation direction relative to the polygonal profile 5. The polygonal profile 6 is arranged in a recess 23 behind the end face 4, as shown in FIG. 4.

The catch is prevented from rotating through engagement between the polygonal latching surface 24 of the sleeve 22 and the recessed polygonal profile 6, forming a rotation lock.

The latching face 24 can be disengaged from the polygonal profile 6 only after the operating button 1 is completely pulled out against the force exerted by spring 9. It would also be feasible to latch the locking surface 24 with the offset polygonal profile 5 arranged behind the locking surface 24. This arrangement produces mutually offset rotation detents of 30 degrees, if a hexagonal profile is used for the profiles 5, 6, 19, and 24.

To enable rotation, the stroke 20 between the operating button 1 and the sleeve 22 must be greater than the shoulder length 21 of the polygonal shoulder 14 so as to ensure that the lower polygonal profiles 5, 6 of the operating button 1 can be disengaged from the sleeve-side contact face 24.

The invention claimed is:

1. A spring-biased locking bolt comprising:
   an operating button having a sleeve section integrally formed with the operating button and oriented in an axial direction, said sleeve section having a first interior polygonal profile continuous through the sleeve section in the axial direction and a second interior polygonal profile formed in an end face of the sleeve section and extending a predetermined axial distance from the end face, with the second interior polygonal profile having an angular offset in the peripheral direction with respect to the first polygonal profile;
   a bolt connected with the operating button;
   a sleeve adapted to be screwed into a corresponding opening in a part, said sleeve having a circular exterior surface extending axially over a portion of the sleeve facing the operating button and an exterior polygonal shoulder extending axially over a remaining portion of the sleeve, wherein the bolt is movable in the sleeve under a spring bias and engagable in the opening;
   wherein in a lowered position of the operating button, the polygonal shoulder of the sleeve engages with the first polygonal profile disposed in the sleeve section, and wherein in a pulled-out position of the operating button, the polygonal shoulder of the sleeve engages with the second offset polygonal profile under the spring bias by rotating the operating button by the angular offset, thereby forming a catch.

2. The spring-biased locking bolt according to claim 1, wherein circular exterior surface transitions into the exterior polygonal shoulder.

3. The spring-biased locking bolt according to claim 1, wherein the first and second polygonal profiles in the sleeve section are each formed as a hexagonal profile, and wherein the polygonal shoulder of the sleeve is also formed as a hexagonal shoulder.

4. The locking bolt according to claim 1, wherein the polygonal shoulder of the sleeve comprises a driving flat for a wrench.

5. The locking bolt according to claim 1, wherein the second offset polygonal profile is recessed in the end face of the sleeve section.

6. The locking bolt according to claim 1, wherein a side of the sleeve facing away from the operating button comprises a threaded projection adapted to be screwed into the part.

7. The locking bolt according to claim 1, further comprising a compression spring having two ends disposed between the sleeve and the bolt, with one end of the compression spring contacting a projection disposed on the bolt and the other end contacting a shoulder formed on the sleeve.

* * * * *

UNITED STATES PATENT AND TRADEMARK OFFICE
CERTIFICATE OF CORRECTION

| | | |
|---|---|---|
| PATENT NO. | : 7,198,306 B2 | Page 1 of 1 |
| APPLICATION NO. | : 10/920147 | |
| DATED | : April 3, 2007 | |
| INVENTOR(S) | : Ambs | |

It is certified that error appears in the above-identified patent and that said Letters Patent is hereby corrected as shown below:

Column 2, Line 15, "BRIEF SUMMARY OR THE INVENTION" should read
-- BRIEF SUMMARY OF THE INVENTION --

Signed and Sealed this

Thirteenth Day of November, 2007

JON W. DUDAS
*Director of the United States Patent and Trademark Office*